(12) United States Patent
Zhou et al.

(10) Patent No.: US 11,797,254 B2
(45) Date of Patent: Oct. 24, 2023

(54) DISPLAY DEVICE AND DRIVING METHOD THEREOF

(71) Applicants: K-TRONICS (SU ZHOU) TECHNOLOGY CO., LTD., Jiangsu (CN); BOE Technology Group Co., Ltd., Beijing (CN)

(72) Inventors: Xiuhe Zhou, Beijing (CN); Jie Wang, Beijing (CN); Zhongcheng Li, Beijing (CN); Zhaoxi Yu, Beijing (CN); Cheng Yang, Beijing (CN)

(73) Assignees: K-TRONICS (SU ZHOU) TECHNOLOGY CO., LTD., Jiangsu (CN); BOE Technology Group Co., Ltd., Beijing (CN)

(*) Notice: Subject to any disclaimer, the term of this patent is extended or adjusted under 35 U.S.C. 154(b) by 462 days.

(21) Appl. No.: 16/979,904

(22) PCT Filed: Dec. 2, 2019

(86) PCT No.: PCT/CN2019/122490
§ 371 (c)(1),
(2) Date: Sep. 11, 2020

(87) PCT Pub. No.: WO2021/103051
PCT Pub. Date: Jun. 3, 2021

(65) Prior Publication Data
US 2023/0098541 A1     Mar. 30, 2023

(51) Int. Cl.
*G06F 3/14* (2006.01)
*G09G 3/36* (2006.01)
*G06F 3/147* (2006.01)

(52) U.S. Cl.
CPC ............ *G06F 3/1446* (2013.01); *G06F 3/147* (2013.01); *G06F 3/1438* (2013.01); *G09G 3/36* (2013.01);
(Continued)

(58) Field of Classification Search
CPC ...... G06F 3/1446; G06F 3/1438; G06F 3/147; G06F 3/0421; G09G 3/36;
(Continued)

(56) References Cited

U.S. PATENT DOCUMENTS 8,866,700 B2 * 10/2014 Inami .................... G06F 1/1624
345/1.3
9,245,016 B2 * 1/2016 Abe ....................... G06F 40/242
(Continued)

FOREIGN PATENT DOCUMENTS

CN       205318363 U      6/2016
CN       105843573 A      8/2016
(Continued)

OTHER PUBLICATIONS

EESR for 19946246.6 dated Apr. 26, 2023.

*Primary Examiner* — Nvijay Shankar
(74) *Attorney, Agent, or Firm* — ArentFox Schiff LLP; Michael Fainberg

(57) ABSTRACT

The present disclosure provides a display device and a driving method thereof. The display device includes a transparent cover plate; a display module, positioned on a side of the transparent cover plate and including a first display module and a second display module which are independent of each other; a first display control circuit, positioned on a side, facing away from the transparent cover plate, of the display module, and configured to independently control the first display module; and a second display control circuit, positioned on the side, facing away from the transparent cover plate, of the display module, and configured to independently control the second display module.

14 Claims, 5 Drawing Sheets

(52) U.S. Cl.
CPC . *G09G 2300/0426* (2013.01); *G09G 2354/00* (2013.01); *G09G 2360/06* (2013.01)

(58) Field of Classification Search
CPC ....... G09G 2300/0426; G09G 2354/00; G09G 2360/06; G09G 2300/023; G09G 3/2092; G09G 2300/026
See application file for complete search history.

(56) References Cited

U.S. PATENT DOCUMENTS

| | | | |
|---|---|---|---|
| 9,547,382 B2* | 1/2017 | Inami | G06F 1/1641 |
| 9,766,785 B2* | 9/2017 | Lee | G06F 3/04842 |
| 10,209,813 B2* | 2/2019 | Yao | H04L 12/12 |
| 10,210,549 B2* | 2/2019 | Yi | G06Q 30/0246 |
| 11,086,444 B2* | 8/2021 | Yao | H04L 12/12 |
| 2012/0246600 A1* | 9/2012 | Abe | G06F 40/242 |
| | | | 715/853 |
| 2013/0082955 A1 | 4/2013 | Becze et al. | |
| 2013/0167040 A1 | 6/2013 | Lee et al. | |
| 2016/0026384 A1* | 1/2016 | Hwang | G06F 3/04886 |
| | | | 715/773 |
| 2016/0085319 A1* | 3/2016 | Kim | H04M 1/0266 |
| | | | 345/156 |
| 2017/0060319 A1* | 3/2017 | Seo | G06F 3/0481 |
| 2019/0164469 A1 | 5/2019 | Yang et al. | |
| 2020/0092519 A1* | 3/2020 | Shin | G10L 17/00 |

FOREIGN PATENT DOCUMENTS

| | | |
|---|---|---|
| CN | 106657842 A | 5/2017 |
| CN | 106775397 A | 5/2017 |
| CN | 108205419 A | 6/2018 |
| CN | 108469945 A | 8/2018 |
| CN | 109637360 A | 4/2019 |

* cited by examiner

DISPLAY DEVICE AND DRIVING METHOD THEREOF

CROSS-REFERENCE TO RELATED APPLICATIONS

The present application is a national phase entry under 35 U.S.C. § 371 of International Application No. PCT/CN2019/122490, filed on Dec. 2, 2019, which claims priority of PCT International application with the application number PCT/CN2019/122188, entitled Conference Display Device and Driving Method Thereof, and filed to China National Intellectual Property Administration (CNIPA) on Nov. 29, 2019, the entire contents of which are incorporated herein by reference in its entirety.

FIELD

The present disclosure relates to the technical field of display, and particularly relates to a display device and a driving method thereof.

BACKGROUND

With rapid development of a display technology, conference display systems begin to be used in various conference rooms and offices gradually. By a conference machine, a series of conferences such as a remote video conference and an on-site conference screen projection can be realized.

SUMMARY

An embodiment of the present disclosure provides a display device, including:
  a transparent cover plate;
  a display module, positioned on a side of the transparent cover plate and including a first display module and a second display module;
  a first display control circuit, positioned on a side, facing away from the transparent cover plate, of the display module and configured to independently control the first display module; and
  a second display control circuit, positioned on the side, facing away from the transparent cover plate, of the display module and configured to independently control the second display module.

Optionally, in the display device provided by an embodiment of the present disclosure, the first display control circuit is electrically connected with the second display control circuit.

The first display control circuit is further configured to transmit a control signal to the second display control circuit.

The second display control circuit is further configured to control the second display module to cooperate with the first display module for corresponding displaying in response to the control signal.

Optionally, in the display device provided by an embodiment of the present disclosure, the first display control circuit includes a first display mainboard, and a master component including a signal output interface.

The second display control circuit includes a second display mainboard including a signal input interface electrically connected with the signal output interface.

The second display mainboard is configured to control the second display module to cooperate with the first display module for corresponding displaying in response to the control signal transmitted from the master component.

Optionally, in the display device provided by an embodiment of the present disclosure, a Windows system is installed in the master component; and an Android system is installed in the first display mainboard and the second display mainboard.

The signal output interface and the signal input interface are high definition multimedia interfaces.

Optionally, in the display device provided by an embodiment of the present disclosure, the second display mainboard is further configured to disconnect a communication with the master component and independently control the second display module in response to a switching command of a user.

Optionally, in the display device provided by an embodiment of the present disclosure, the first display control circuit further includes a first display driver board. The first display mainboard transmits a display signal to the first display module through the first display driver board to control the first display module to display.

The second display control circuit further includes a second display driver board. The second display mainboard transmits a display signal to the second display module through the second display driver board so as to control the second display module to display.

Optionally, in the display device provided by an embodiment of the present disclosure, the first display control circuit further includes a master adapter board electrically connected with the master component. The master component is electrically connected with the first display mainboard through the master adapter board.

Optionally, in the display device provided by an embodiment of the present disclosure, the first display control circuit further includes a first display power panel. The first display power panel is electrically connected with the first display mainboard and the master adapter board and supplies power for the first display mainboard and the master adapter board.

The second display control circuit includes a second display power panel. T the second display power panel is electrically connected with the second display mainboard and supplies power for the second display mainboard.

Optionally, in the display device provided by an embodiment of the present disclosure, the first display control circuit includes an infrared remote-control receiving component. The second display control circuit includes a Bluetooth remote-control receiving component.

Optionally, in the display device provided by an embodiment of the present disclosure, the first display control circuit and the second display control circuit are integrated on a same circuit board.

Optionally, in the display device provided by an embodiment of the present disclosure, an orthographic projection of the second display module on the transparent cover plate covers an orthographic projection of the circuit board on the transparent cover plate.

Optionally, in the display device provided by an embodiment of the present disclosure, the transparent cover plate is tempered glass.

An embodiment of the present disclosure further provides a driving method of the display device, including:
  in a first working mode, independently controlling, by the first display control circuit, the first display module to display, and independently controlling, by the second display control circuit, the second display module to display.

Optionally, the driving method provided by an embodiment of the present disclosure further includes:

in a second working mode, transmitting, by the first display control circuit, a control signal to the second display control circuit, and controlling, by the second display control circuit, the second display module to cooperate with the first display module for corresponding displaying in response to the control signal.

Optionally, the driving method provided by an embodiment of the present disclosure further includes: in the second working mode, transmitting, by a master component of the first display control circuit, the control signal to a second display mainboard of the second display control circuit; and controlling, by the second display mainboard, the second display module to cooperate with the first display module for corresponding displaying in response to the control signal transmitted by the master component.

Optionally, the driving method provided by an embodiment of the present disclosure further includes:

disconnecting, by the second display mainboard, a communication with the master component and independently controlling the second display module in response to a switching command of a user.

DETAILED DESCRIPTION OF THE EMBODIMENTS

A detailed description will be given below of specific implementation modes of a display device and a driving method thereof according to embodiments of the present disclosure with reference to the accompanying drawings. It should be noted that the described embodiments are only a part of the embodiments of the present disclosure, and not all of the embodiments. All other embodiments, which can be obtained by a person skilled in the art without making any creative effort based on the embodiments in the present disclosure, belong to the scope of protection of the present disclosure.

In related art, an existing conference machine on the market cannot be used for implementing other operations during a screen projection conference due to structural limitation, so that participants still need to carry notebooks to record key points. Further, during summarizing discussion after ending of the screen projection, the key points cannot be extracted for discussion in the first time, and need to be written on a blackboard one by one, the process is troublesome, and the efficiency is affected.

That is, the conference device in the related art cannot perform other operations such as writing and recording while performing a video conference, and the effective utilization rate is low.

Figure 1:
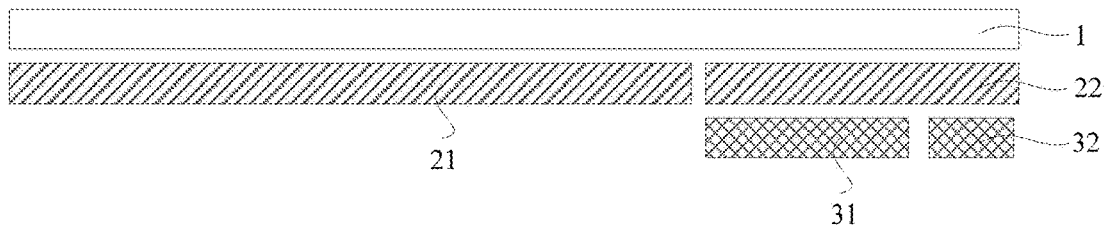
FIG. 1 is a schematic cross-sectional view of a display device provided in accordance with an embodiment of the present disclosure.
Figure 2:
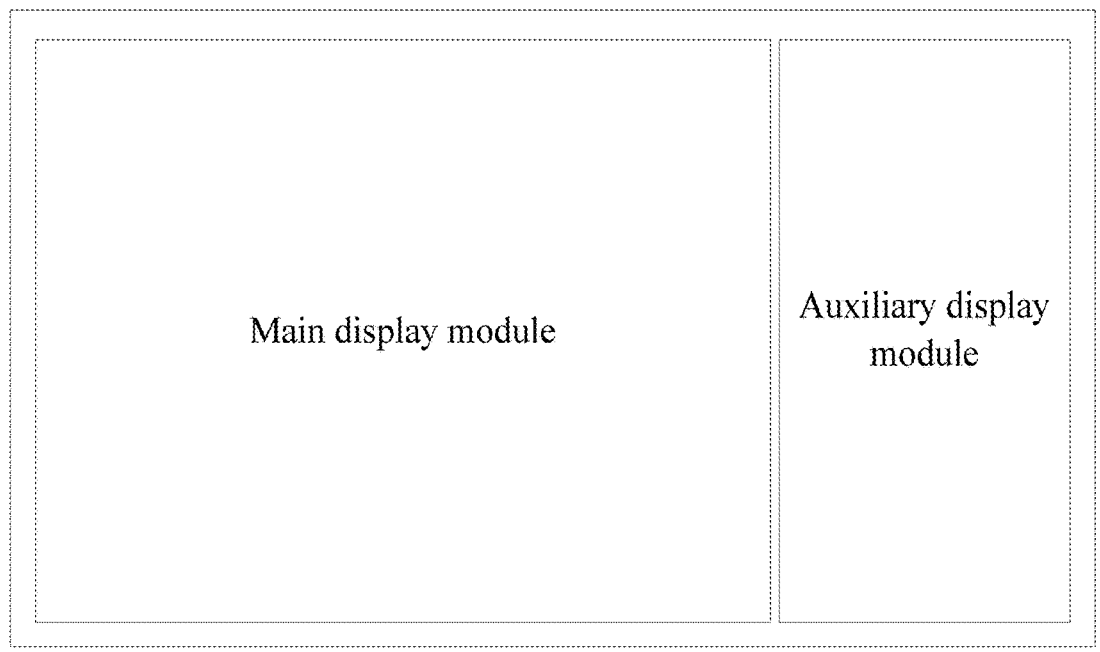
FIG. 2 is a schematic top view of a display device provided in accordance with an embodiment of the present disclosure.

An embodiment of the present disclosure provides a display device, referring to FIG. 1 and FIG. 2. FIG. 1 is a schematic cross-sectional view of FIG. 2, and the display device includes:

a transparent cover plate 1;

a display module; the display module is positioned on a side of the transparent cover plate 1, and includes a first display module 21 and a second display module 22; the first display module 21 and the second display module 22 specifically may be independently controlled for displaying; for example, the first display module 21 may be enabled to display only, the second display module 22 may be enabled to display only, and the first display module 21 and the second display module 22 may also be enabled to display simultaneously;

a first display control circuit 31; the first display control circuit 31 is positioned on a side, facing away from the transparent cover plate 1, of the display module, and is configured to independently control the first display module 21; and for example, the first display control circuit 31 independently controls the first display module 21 to display conference frames; and a second display control circuit 32; the second display control circuit 32 is positioned on the side, facing away from the transparent cover plate 1, of the display module, and is configured to independently control the second display module 22; and for example, the second display control circuit 32 independently controls the second display module 22 to display recorded information of the conference input by a user.

Optionally, in the display device provided by an embodiment of the present disclosure, the first display control circuit 31 may be electrically connected with the second display control circuit 32.

The first display control circuit 31 is further configured to transmit a control signal to the second display control circuit 32.

The second display control circuit 32 is further configured to control the second display module 22 to cooperate with the first display module 21 for corresponding displaying in response to the control signal.

For example, during conference display, the first display module 21 and the second display module 22 are required to cooperate with each other to form an integrated display area so as to display a video or picture in a conference process. At the moment, the first display control circuit 31 may transmit a corresponding control signal to the second display control circuit 32 so that the second display control circuit 32 controls the second display module 22 to cooperate with the first display module 21 for synchronous displaying, namely. That is, the first display module 21 displays part of the picture or displays part of a picture in the video, the second display module 22 displays the other part of the picture or displays the other part of a picture in the video, and a complete picture or video is formed.

Specifically, in the display device provided by some embodiments of the present disclosure, the first display control circuit 31 may independently control the first display module 21, the second display control circuit 32 may independently control the second display module 22, displaying may be implemented through the first display module, recording may be implemented on the second display module, double screens may display contents synchronously, and may also display contents independently, and thus, the display device has high utilization efficiency when used as a conference device.

Figure 3:
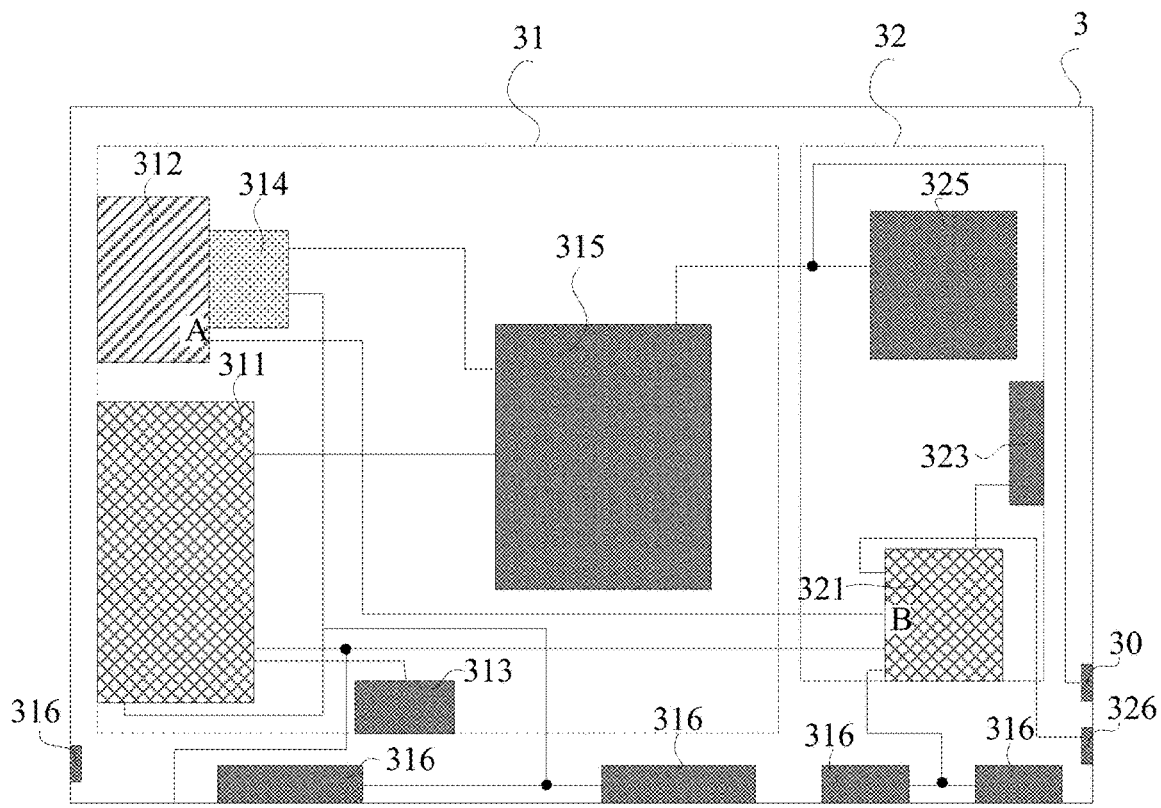
FIG. 3 is a structure diagram of a circuit board in a display device provided in accordance with an embodiment of the present disclosure.

During specific implementation, in the display device provided by some embodiments of the present disclosure, referring to FIG. 3, the first display control circuit 31 may include a first display mainboard 311 and a master component 312. An Android system may be installed in the first display mainboard 311. A Windows system may be installed in the master component 312. The master component 312 includes a signal output interface A. The master component 312 may be an open pluggable specification (OPS) component. The signal output interface A may be a high definition multimedia interface (HDMI).

The second display control circuit 32 may include a second display mainboard 321. An Android system may be installed in the second display mainboard 321 which includes a signal input interface B. the signal input interface B of the second display mainboard 321 is electrically connected with the signal output interface A of the master component 312. The signal input interface B may be an HDMI input interface B.

The second display mainboard 321 is configured to control the second display module 22 to cooperate with the first display module 21 for corresponding displaying in response to the control signal transmitted by the master component 312.

Specifically, after the first display control circuit 31 receives a synchronous display command indicated by the user, a mode of driving the first display module 21 by the first display mainboard 311 is switched into a mode of driving the first display module 21 by the master component 312, and the master component 312 is controlled to transmit the control signal to the second display mainboard 321; and after the second display mainboard 321 receives the control signal of the master component 312, the displayed contents of the second display module 22 are controlled according to the control signal. For example, the contents of the first display module 21 may be extended to the second display module 22, namely, the first display module 21 and the second display module 22 serve as an integrated display screen for displaying, or the second display module 22 may be controlled to display the displayed contents which are the same as the displayed contents of the first display module 21, namely, the second display module 22 copies the displayed contents of the first display module 21.

It needs to be explained that the full name of OPS is Open Pluggable Specification, and the OPS is a standardized digital signage interface specification made by Intel and display manufacturers together. An X86 architecture mini PC is formed in the OPS, and an Intel Core processor is adopted, and cooperates with a memory, a hard disk, various input and output interfaces and a Windows operation interface. In some embodiments of the present disclosure, implementation of function expansion is the main purpose. On the one hand, although some embodiments of the present disclosure can meet a daily conference display requirement under the condition of no OPS, bottlenecks may be encountered during manuscript writing and large software running (such as CAD and 3D modeling), and under the condition, an OPS computer needs to be used to enrich and expand the functions of the display device. On the other hand, according to some embodiments of the present disclosure, an interactive display function of a main screen and an auxiliary screen may also be realized through the OPS, and the HDMI output of an OPS module is connected with the HDMI input of an auxiliary screen mainboard (the second display control circuit 32) through an HDMI wire. OPS contents may be transmitted to the auxiliary screen (the second display module 22); when the main screen (the first display module 21) is switched to the OPS mode (Windows system), and the auxiliary screen is switched to the HDMI channel, the main screen and the auxiliary screen may be simultaneously used for displaying, the contents displayed by the main screen may be extended to the auxiliary screen, and the contents of the main screen may also be copied to the auxiliary screen to realize double-screen interaction. In addition, during specific implementation, due to the fact that the main operation system implemented by some embodiments of the present disclosure is the Android system, the first display mainboard 311 and the second display mainboard 321 adopt the Android system, and the cost can be saved. However, lots of application software in the market, especially some large software, cannot well run on the Android system, so that the Windows system of an OPS component is needed to supplement and enhance the functions of the device.

Specifically, in the display device provided by some embodiments of the present disclosure, a main control component 312 provided with the Windows system is adopted to control both display of the first display module 21 and display of the second display module 22, so that the problems that when the first display mainboard 311 is adopted to directly control the second display mainboard 321, the second display module 22 cannot distinguish difference of signals transmitted by the two mainboards due to the fact that the first display mainboard 311 and the second display mainboard 321 are both provided with the same operation system, and the second display module 22 is out of control and cannot work are avoided. The second display mainboard 321 is controlled through the OPS, when the first display module 21 is switched to OPS driving, the second display module 22 only needs to be switched to the HDMI channel, and then the second display module 22 and the first display module 21 may display contents synchronously. If the second display module 22 does not switch the channel, the second display module 22 may also display the contents independently due to the fact that the second display mainboard 321 is provided with the Android system. In addition, an implementing mode of controlling the second display mainboard 321 through the OPS is convenient, the OPS may be connected with the second display mainboard 321 through one HDMI channel only, and the software of the first display mainboard 311 and the software of the second display mainboard 321 do not need to be modified complicatedly.

During specific implementation, in the display device provided by some embodiments of the present disclosure, the second display mainboard 321 is configured to, in response to the switching command of the user, when it is switched that the second display mainboard 321 drives the second display module 22, disconnect a communication with the master component 312, and independently control the second display module 22, and thus, the first display control circuit 31 and the second display control circuit 32 work independently.

In some embodiments of the present disclosure, when the second display control circuit 32 is switched to the Android system driven by the second display mainboard 321, the first display control circuit 31 may be disconnected from the second display control circuit 32, specifically, disconnection may be implemented through software, switching of corresponding functions is realized through the software by switching different signal channels, and if an Android channel is used by switching, the auxiliary screen works independently; and if the HDMI channel is used by switching, the auxiliary screen and the main screen may be used simultaneously, and then the first display module 21 and the second display module 22 may work independently.

During specific implementation, referring to FIG. 3, the first display control circuit 31 further includes a first display driver board 313 such as T-CON; the first display mainboard 311 transmits a display signal to the first display module 21 through the first display driver board 313 so as to control the first display module 21 to display; the second display control circuit 32 further includes a second display driver board 323 such as T-CON; and the second display mainboard 321 transmits a display signal to the second display module 22 through the second display driver board 323 so as to control the second display module 22 to display. The display signal may be a processed image signal, namely, an image data signal, a clock signal and the like transmitted by the first display control circuit 31 are converted into a digital signal such as row and column driving signals required for the first display module 21 to drive a liquid crystal display to display images.

During specific implementation, referring to FIG. 3, the first display control circuit 31 may include a master adapter board 314 electrically connected with the master component 312; and the master component 312 is electrically connected with the first display mainboard 311 through the master adapter board 314.

During specific implementation, referring to FIG. 3, the first display control circuit 31 may further include a first display power panel 315, the first display power panel 315 is electrically connected with the first display mainboard 311 and the master adapter board 314, and supplies power for the first display mainboard 311 and the master adapter board 314; and the second display control circuit 32 may further include a second display power panel 325, and the second display power panel 325 is electrically connected with the second display mainboard 321 and supplies power for the second display mainboard 321.

During specific implementation, referring to FIG. 3, the first display control circuit 31 may further include an infrared remote-control receiving component 316; and the second display control circuit 32 may further include a Bluetooth remote-control receiving component 326.

In some embodiments of the present disclosure, the first display control circuit 31 includes the infrared remote-control receiving component 316, the second display control circuit 32 includes the Bluetooth remote-control receiving component 326, namely, the type of the remote-control receiving component of the first display control circuit 31 is different from the type of the remote-control receiving component of the second display control circuit 32, and mutual interference of the first display control circuit 32 or the second display control circuit 32 when remote-control signals are received in conference may be avoided.

During specific implementation, referring to FIG. 3, each of the first display control circuit 31 and the second display control circuit 32 may further be provided with the infrared remote-control receiving component 316.

During specific implementation, referring to FIG. 3, the first display control circuit 31 and the second display control circuit 32 are integrated on a same circuit board 3. The circuit board 3 may be provided with a power interface 30 which supplies power for the second display power panel 325 and the first display power panel 315. Moreover, in the circuit board, components in the first display control circuit 31 and the second display control circuit 32 are hardware board cards which are independent of one another, namely, components such as the first display mainboard 311, the master component 312, the first display driver board 313, the second display mainboard 321 and the second display driver board 323 are independent of one another, and belong to board cards which are independent of one another.

Figure 4:
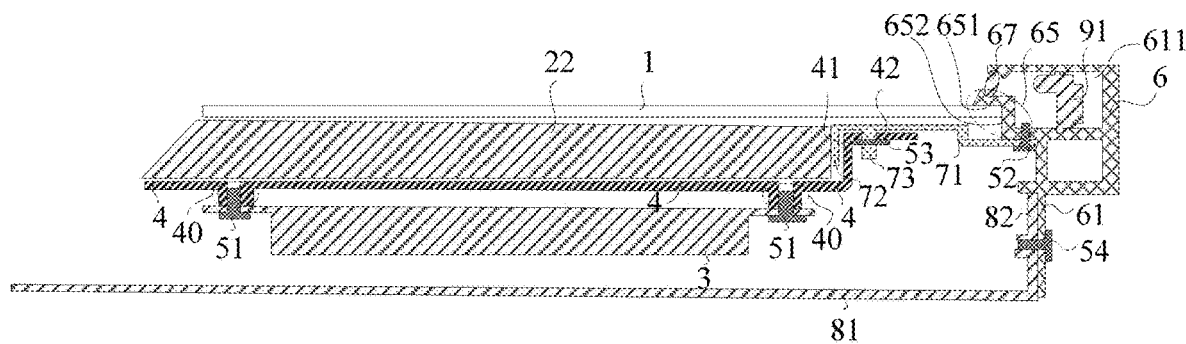
FIG. 4 is a structure diagram of a fixing mode for a second display module and a housing in a display device provided in accordance with an embodiment of the present disclosure.

During specific implementation, referring to FIG. 4, the orthographic projection of the second display module 22 on the transparent cover plate 1 covers the orthographic projection of the circuit board 3 on the transparent cover plate 1.

During specific implementation, referring to FIG. 4, a second display module pressing plate 4 is further arranged between the second display module 22 and the circuit board 3, and a side, facing the circuit board 3, of the second display module pressing plate 4 is provided with at least two protruded holes 40; and first via holes are formed in positions, corresponding to the protruded holes 40, of the circuit board 3, and the circuit board 3 and the second display module pressing plate 4 are fixed through first fixing components 51 which penetrate through the protruded holes 40 and the first via holes. The first fixing components 51 may be screws. In some embodiments of the present disclosure, the second display module pressing plate 4 is further arranged between the second display module 22 and the circuit board 3, and the circuit board 3 may be fixed to a side, facing away from the transparent cover plate 1, of the second display module 22.

During specific implementation, referring to FIG. 4, the display device further includes a profile frame 6 surrounding edges of the transparent cover plate 1; a gap area is formed between the second display module 22 and the profile frame 6; the display device is provided with an auxiliary screen support in the gap area; the auxiliary screen support includes a support main body 71 of which an extending direction is the same as that of the transparent cover plate 1, one end of the support main body 71 is fixed to the profile frame 6 through a second fixing component 52, the second fixing component 52 may be a screw, and the other end of the support main body 71 is provided with a first vertical portion 72 which extends in a direction perpendicular to the extending direction of the support main body 71; and the first vertical portion 72 is in contact with one end of the second display module 22, and is used for limiting and fixing the second display module 22. In some embodiments of the present disclosure, the display device further includes the profile frame 6 and the support main body 71, the profile frame 6 may limit the transparent cover plate 1, the first vertical portion 72 of the support main body 71 may limit and fix the second display module 22, then the second display module 22 is assembled and fixed to the transparent cover plate 1 and the profile frame 6 through the auxiliary screen support, moreover, the auxiliary screen support is light and thin, and while the second display module 22 is fixed to the transparent cover plate 1 and the profile frame 6, lightness and thinness of the display device can be realized.

During specific implementation, referring to FIG. 4, the auxiliary screen support further includes a second vertical portion 73 extending in the direction perpendicular to the extending direction of the support main body 71, and the second vertical portion 73 is positioned on a side, facing the profile frame 6, of the first vertical portion 72; the second display module pressing plate 4 further includes a bent portion 41 positioned between the first vertical portion 72 and the second vertical portion 73 and a fixing portion 42 which is connected with an end of the bent portion 41 and extends in the extending direction of the support main body 71, and a second via hole is formed in a position, corresponding to the second vertical portion 73, of the fixing portion 42; and the second vertical portion 73 penetrates through the second via hole, and is fixed to the fixing portion 42 through a third fixing component 53, and the third fixing component 53 may be a nut. In some embodiments of the present disclosure, the auxiliary screen support further includes the second vertical portion 73, the second display module pressing plate 4 further includes the fixing portion 42, the fixing portion 42 may penetrate through the second vertical portion 73, then, the second display module pressing plate 4 is assembled and fixed to the auxiliary screen support, the circuit board 3 is further fixed to the second display module 22, the transparent cover plate 1 and the profile frame 6 integrally, moreover, a mode of fixing the second display module pressing plate 4 to the auxiliary screen support by enabling the fixing portion 42 to penetrate through the second vertical portion 73 is simple and firm, and lightness and thinness of the display device are facilitated.

During specific implementation, referring to FIG. 4, the display device further includes a housing positioned on a side, facing away from the transparent cover plate, of the circuit board 3, the housing includes a housing main body 81 and a housing bent portion 82 which is positioned at an end of the housing main body 81 and extends towards a direction to the circuit board 3; and the profile frame 6 further includes a profile frame extending portion 61 extending to a side away from the transparent cover plate 1, the profile frame extending portion 61 and the housing bent portion 82 are fixed through a fourth fixing component 54 at an overlapped position, and the fourth fixing component 54 may be a screw. In some embodiments of the present disclosure, the display device further includes the housing positioned on the side, facing away from the transparent cover plate, of the circuit board 3, the housing includes the housing bent portion 82, the profile frame 6 further includes the profile frame extending portion 61, the housing bent portion 82 and the profile frame extending portion 61 are overlapped, and then are fixed through the fourth fixing component 54; the profile frame 6, the auxiliary screen support and the second display module pressing plate 4 may further be fixed to the housing, moreover, the profile frame extending portion 61 and the housing bent portion 82 are fixed at the overlapped position, a mode of fixing the profile frame extending portion 61 and the housing bent portion 82 is simple in structure, and the space is saved.

Figure 5:
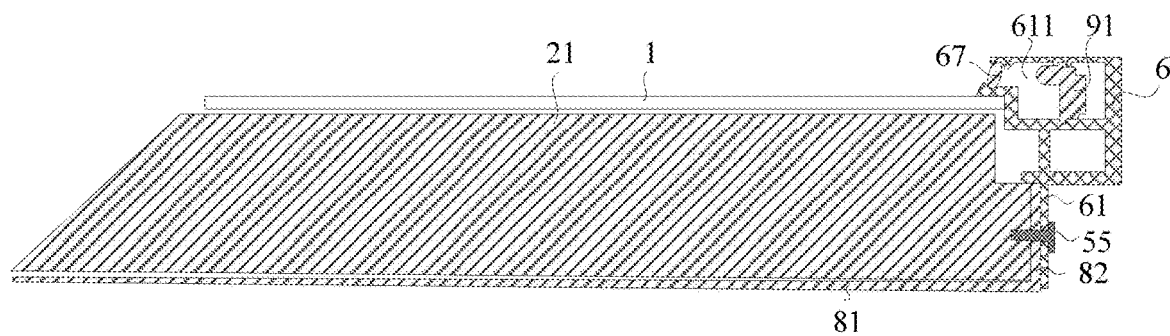
FIG. 5 is a structure diagram of a fixing mode for a first display module and a housing in a display device provided in accordance with an embodiment of the present disclosure.

During specific implementation, referring to FIG. 5, a side end of the first display module 21 is opposite to the housing bent portion 82 and the profile frame extending portion 61, the first display module 21, the housing bent portion 82 and the profile frame extending portion 61 are fixed through a fifth fixing component 55, and the fifth fixing component 55 may be a screw. During specific implementation, the first display module 21 may serve as a main display module, the second display module 22 may serve as an auxiliary display module, because a required arrangement space is correspondingly larger along with a larger size of the main display module, the circuit board 3 may be arranged at a position corresponding to the auxiliary display module, and then the housing main body 81, the first display module 21 and the profile frame 6 may be integrally fixed at a position of the main display module through the fifth fixing component only directly. Moreover, the circuit board 3 is arranged at a position corresponding to the second display module 22, and balanced distribution of weights of the display device at different positions is also facilitated.

During specific implementation, the conference device further includes touch equipment.

Figure 6:
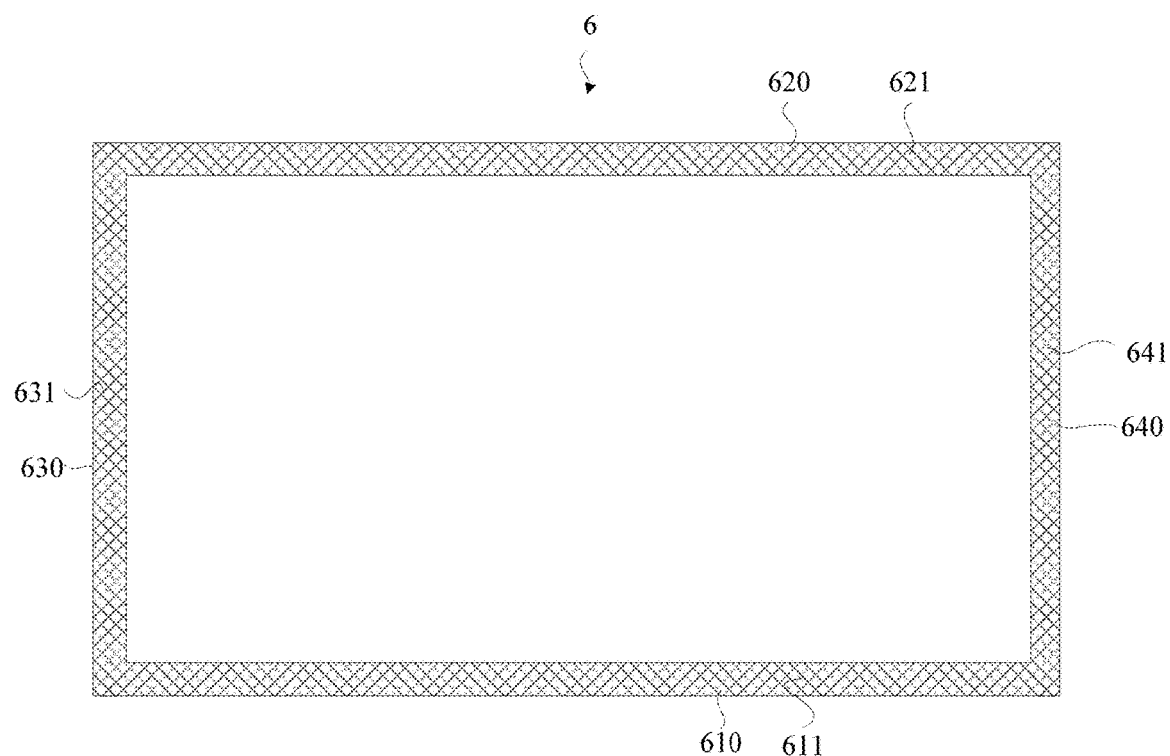
FIG. 6 is a schematic top view of a profile frame in a display device provided in accordance with an embodiment of the present disclosure.

In combination with FIG. 4 and FIG. 6, FIG. 6 is a schematic top view of the profile frame 6, the profile frame 6 includes a first border 610 and a second border 620 which are opposite to each other as well as a third border 630 and a fourth border 640 which are opposite to each other; a first through groove 611 of which an extending direction is the same as that of the first border 610 is formed in the first border 610, a second through groove 621 of which an extending direction is the same as that of the second border 620 is formed in the second border 620, a third through groove 631 of which an extending direction is the same as that of the third border 630 is formed in the third border 630, and a fourth through groove 641 of which an extending direction is the same as that of the fourth border 640 is formed in the fourth border 640.

The touch equipment includes a plurality of first infrared transmitting components 91 positioned in the first through groove 611 and arranged successively, a plurality of first infrared detecting components (not shown) positioned in the second through groove 621 and arranged successively, a plurality of second infrared transmitting components (not shown) positioned in the third through groove 631 and arranged successively and a plurality of second infrared detecting components (not shown) positioned in the fourth through groove 641 and arranged successively.

In some embodiments of the present disclosure, the first infrared transmitting components 91 are arranged in the first through groove 611, the first infrared detecting components are arranged in the second through groove 621, the second infrared transmitting components are arranged in the third through groove 631, the second infrared detecting components are arranged in the fourth through groove, thus, infrared rays which are crisscrossed are formed on a surface of the display device, when the user touches the display device with a finger, varying infrared signals are detected through the infrared detecting components in the opposite borders, and then a touch position may be detected.

During specific implementation, touch circuit substrates are further arranged on an inner wall of the first through groove, an inner wall of the second through groove, an inner wall of the third through groove and an inner wall of the fourth through groove separately; and the first infrared transmitting components, the first infrared detecting components, the second infrared transmitting components and the second infrared detecting components are fixed to the touch circuit substrates. The first infrared transmitting components and the second infrared transmitting components may be infrared light-emitting lamp beads, and the first infrared detecting components and the second infrared detecting components may be infrared photosensitive sensors.

During specific implementation, in combination with FIG. 4, a side, which faces the transparent cover plate 1, of each of the first through groove 611, the second through groove 621, the third through groove 631 and the fourth through groove 641 is provided with a limiting portion 65 and a light outlet; and each of the limiting portions 65 is step-shaped, a side, which faces the transparent cover plate 1, of each of the limiting portions 65 is provided with a first surface 651 and a second surface 652 which are perpendicular to each other; the first surfaces 651 are in contact with a surface of a portion, facing away from the display module, of the transparent cover plate 1, and the second surfaces 652 are in contact with a side surface of the transparent cover plate 1 and are used for limiting the transparent cover plate 1.

During specific implementation, referring to FIG. 4, a light filter 67 further covers each of the light outlets. In some embodiments of the present disclosure, each of the light filters 67 further covers the corresponding light outlet, and other light except for infrared light transmitted by the infrared transmitting components may be filtered out.

During specific implementation, the transparent cover plate is tempered glass. In some embodiments of the present disclosure, the transparent cover plate is the tempered glass, the user usually writes on the surface of the display device, therefore, the transparent cover plate 1 is required to have a certain hardness, and the transparent cover plate which is the tempered glass may meet the requirement of writing on the surface of the transparent cover plate.

Figure 7:
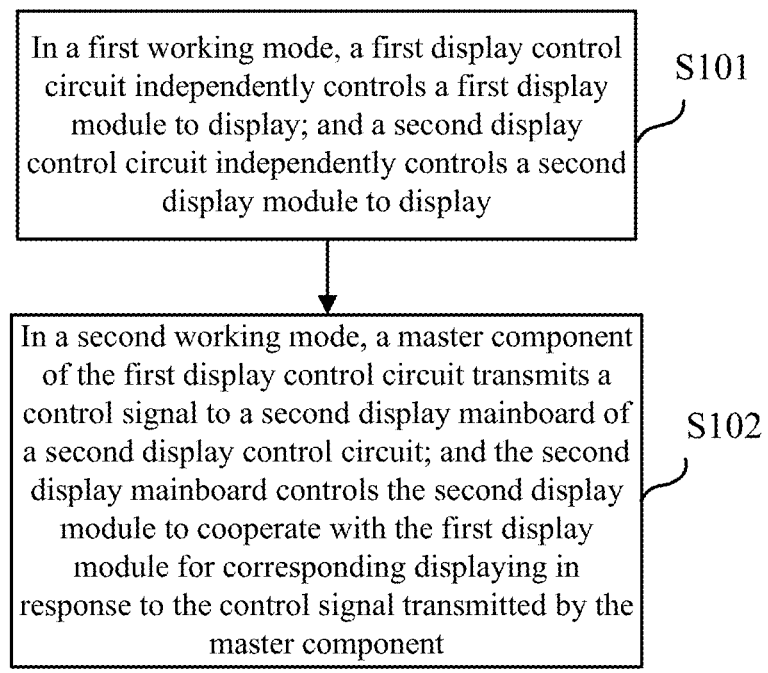
FIG. 7 is a flow chart of a driving method of a display device provided in accordance with an embodiment of the present disclosure.

Referring to FIG. 7, some embodiments of the present disclosure further provides a driving method of the display device provided by some embodiments of the present disclosure, and the driving method includes:

step S101, in a first working mode, a first display control circuit independently controls a first display module to display; and a second display control circuit independently controls a second display module to display.

Referring to FIG. 7, the driving method provided by some embodiments of the present disclosure may further include:

step S102, in a second working mode, the first display control circuit transmits a control signal to the second display control circuit, and the second display control circuit controls the second display module to cooperate with the first display module for corresponding displaying in response to the control signal.

Specifically, in the second working mode, a master component of the first display control circuit transmits the control signal to a second display mainboard of the second display control circuit.

The second display mainboard controls the second display module to cooperate with the first display module for corresponding displaying in response to the control signal transmitted by the master component.

Specifically, the driving method provided by some embodiments of the present disclosure may further include:

the second display mainboard disconnects a communication with the master component and independently controls the second display module in response to a switching command of a user.

Figure 8:
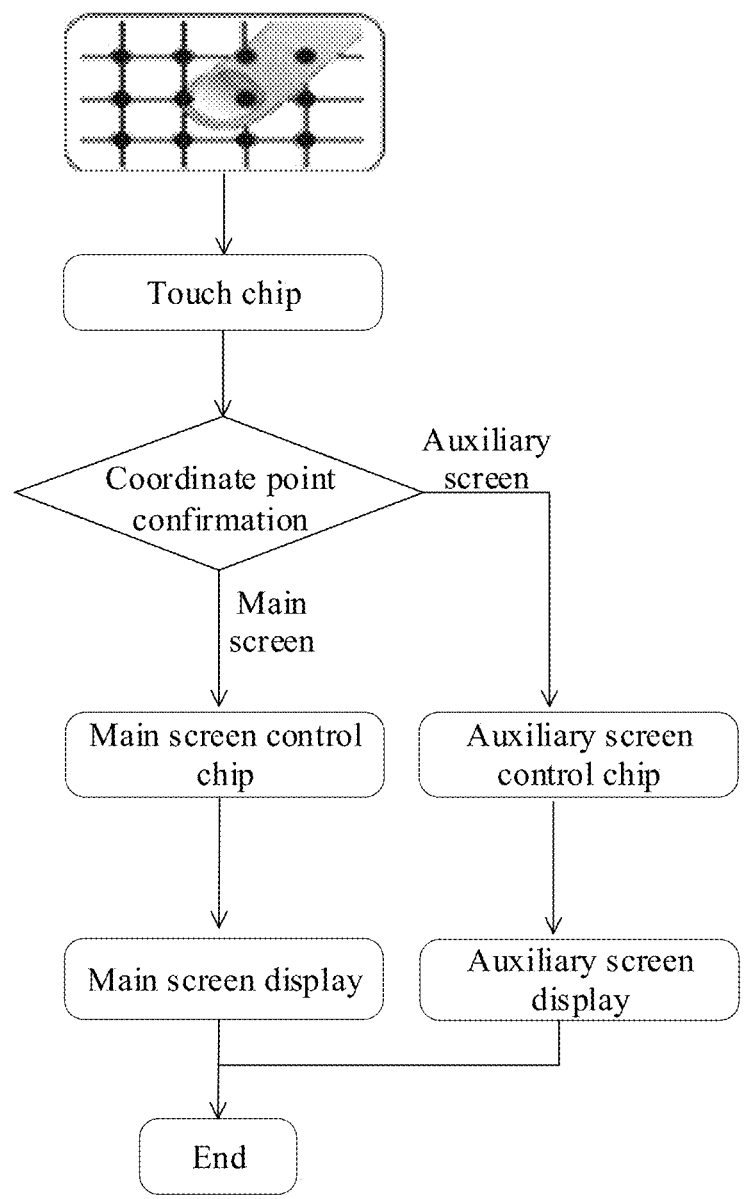
FIG. 8 is a specific flow chart for implementing a touch function in a driving method of a display device provided in accordance with an embodiment of the present disclosure.

During specific implementation, referring to FIG. 8, the driving method may further include the following.

The step that the first display control circuit controls the first display module to display includes:

the touch equipment (which may be a touch chip of touch equipment) transmits a first touch command to the first display control circuit when determining that a touch position is located in an area where the first display module is located; and the first display control circuit controls the first display module to display according to the first touch command.

The step that the second display control circuit controls the second display module to display includes:

the touch equipment transmits a second touch command to the second display control circuit when determining that the touch position is located in an area where the second display module is located; and the second display circuit controls the second display module to display according to the second touch command.

While preferred embodiments of the present disclosure have been described, additional changes and modifications may be made to these embodiments by those skilled in the art once the basic inventive concept has been learned. It is therefore intended that the appended claims are construed to include the preferred embodiments as well as all changes and modifications that fall within the scope of the present disclosure.

It will be apparent to those skilled in the art that various modifications and variations can be made to the embodiments of the present disclosure without departing from the spirit and scope of the embodiments of the present disclosure. Thus, if such modifications and variations of the embodiments of the present disclosure fall within the scope of the claims of the present disclosure and their equivalents, the present disclosure is also intended to encompass these modifications and variations.

What is claimed is:

1. A display device, comprising:
   a transparent cover plate;
   a display module, positioned on a side of the transparent cover plate and comprising a first display module and a second display module;
   a first display control circuit, positioned on a side, facing away from the transparent cover plate, of the display module and configured to independently control the first display module; and
   a second display control circuit, positioned on the side, facing away from the transparent cover plate, of the display module and configured to independently control the second display module;
   wherein the first display control circuit is electrically connected with the second display control circuit;
   the first display control circuit is further configured to transmit a control signal to the second display control circuit;
   the second display control circuit is further configured to control the second display module to cooperate with the first display module for corresponding displaying in response to the control signal; and
   the first display control circuit comprises:
      a first display mainboard; and
      a master component, comprising:
         a signal output interface;
   the second display control circuit comprises:
      a second display mainboard, comprising:
         a signal input interface electrically connected with the signal output interface;
   wherein the second display mainboard is configured to control the second display module to cooperate with the first display module for corresponding displaying in response to the control signal transmitted by the master component.

2. The display device according to claim 1, wherein:
   a Windows system is installed in the master component;
   an Android system is installed in the first display mainboard and the second display mainboard; and the signal output interface and the signal input interface are high definition multimedia interfaces.

3. The display device according to claim 1, wherein the second display mainboard is further configured to disconnect a communication with the master component and independently control the second display module in response to a switching command of a user.

4. The display device according to claim 1, wherein:
the first display control circuit further comprises:
a first display driver board;
wherein the first display mainboard transmits a display signal to the first display module through the first display driver board so as to control the first display module to display; and
the second display control circuit further comprises:
a second display driver board;
wherein, the second display mainboard transmits a display signal to the second display module through the second display driver board so as to control the second display module to display.

5. The display device according to claim 4, wherein:
the first display control circuit further comprises:
a master adapter board, electrically connected with the master component;
wherein the master component is electrically connected with the first display mainboard through the master adapter board.

6. The display device according to claim 5, wherein:
the first display control circuit further comprises:
a first display power panel;
wherein the first display power panel is electrically connected with the first display mainboard and the master adapter board and supplies power for the first display mainboard and the master adapter board;
the second display control circuit further comprises:
a second display power panel;
wherein the second display power panel is electrically connected with the second display mainboard and supplies power for the second display mainboard.

7. The display device according to claim 1, wherein:
the first display control circuit further comprises an infrared remote-control receiving component; and
the second display control circuit further comprises a Bluetooth remote-control receiving component.

8. The display device according to claim 1, wherein the first display control circuit and the second display control circuit are integrated on a same circuit board.

9. The display device according to claim 8, wherein an orthographic projection of the second display module on the transparent cover plate covers an orthographic projection of the circuit board on the transparent cover plate.

10. The display device according to claim 1, wherein the transparent cover plate is tempered glass.

11. A driving method of the display device according to claim 1, comprising:
in a first working mode:
independently controlling, by the first display control circuit, the first display module to display, and
independently controlling, by the second display control circuit, the second display module to display.

12. The driving method according to claim 11, further comprising:
in a second working mode:
transmitting, by the first display control circuit, a control signal to the second display control circuit, and
controlling, by the second display control circuit, the second display module to cooperate with the first display module for corresponding displaying in response to the control signal.

13. The driving method according to claim 12, wherein in the second working mode:
a master component of the first display control circuit transmits the control signal to a second display mainboard of the second display control circuit; and
the second display mainboard controls the second display module to cooperate with the first display module for corresponding displaying in response to the control signal transmitted by the master component.

14. The driving method according to claim 13, further comprising:
disconnecting, by the second display mainboard, a communication with the master component and independently controlling the second display module in response to a switching command of a user.

* * * * *